Dec. 13, 1966 W. L. McCANN ETAL 3,290,962
PLANETARY TRANSMISSION
Filed Oct. 17, 1962 8 Sheets-Sheet 5 fig.10.

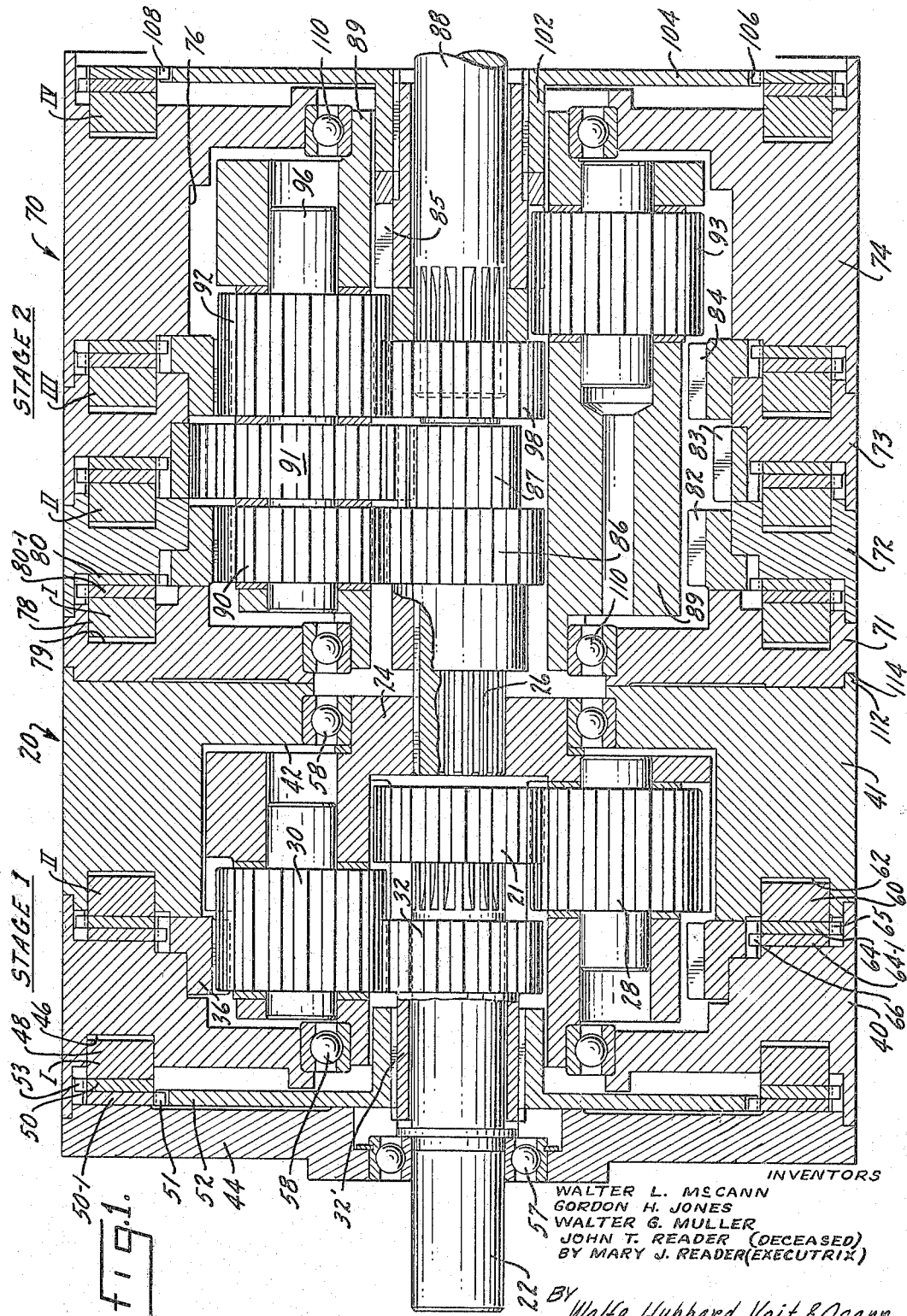

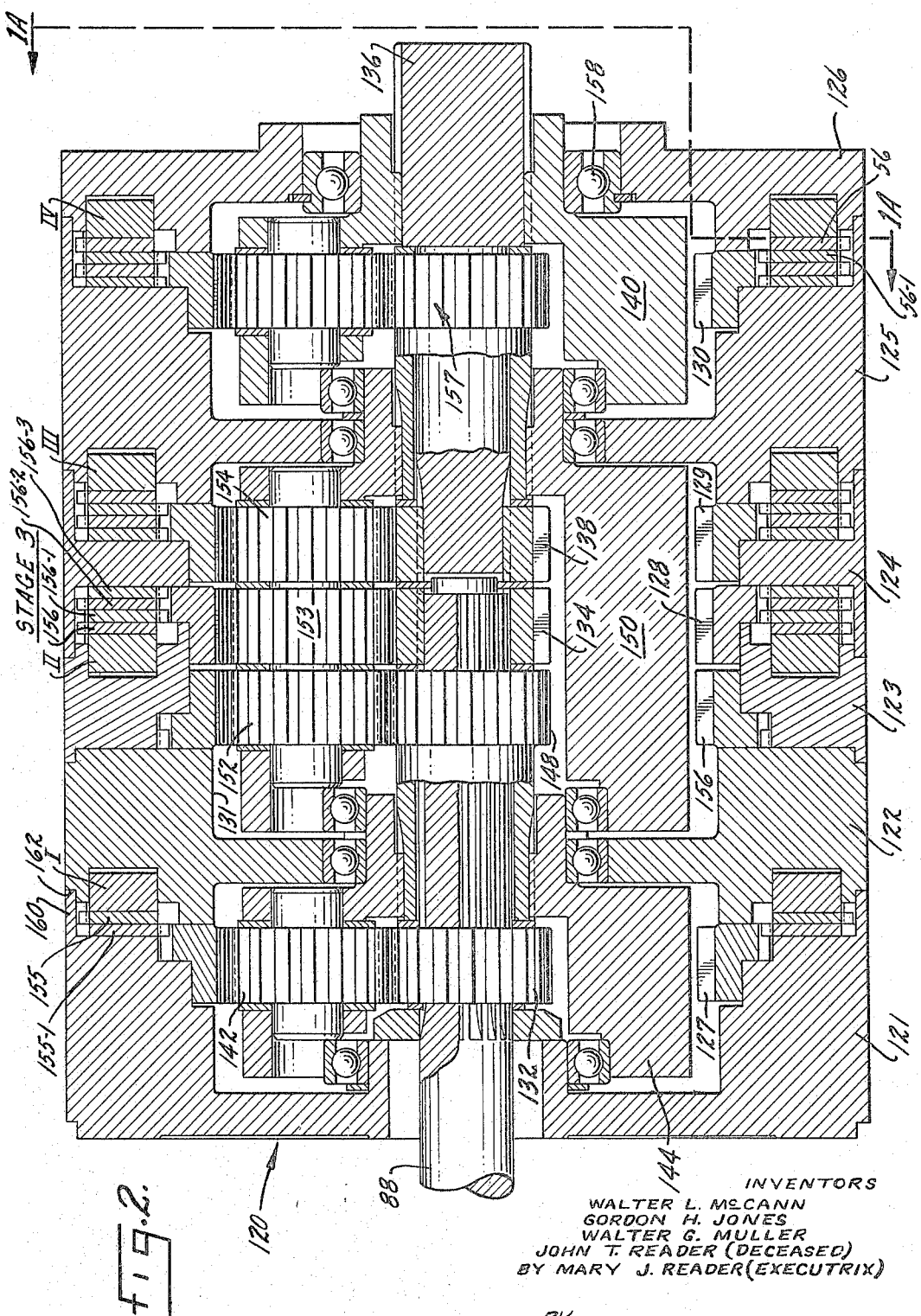

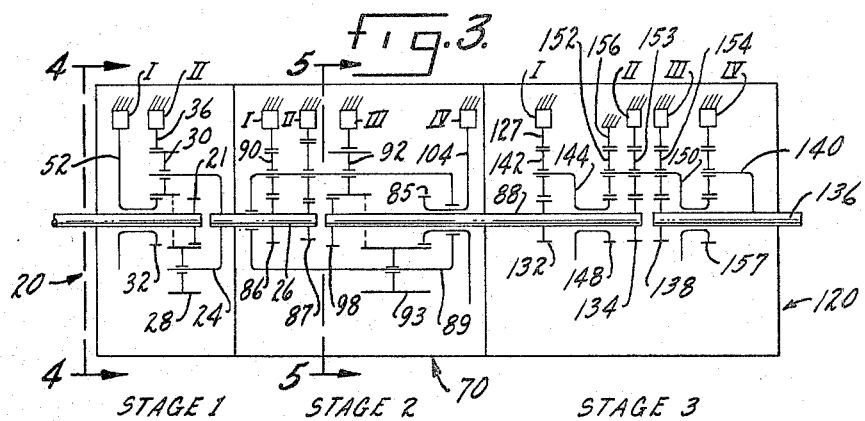
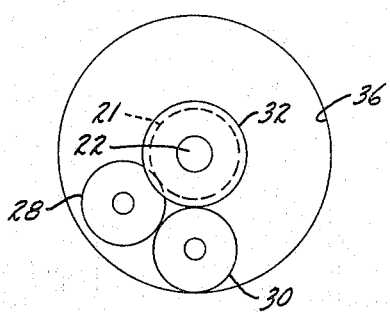
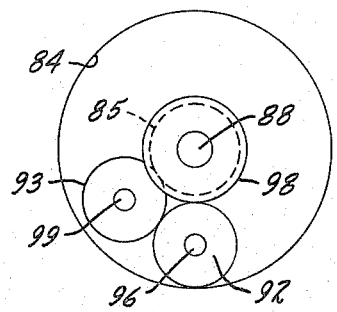
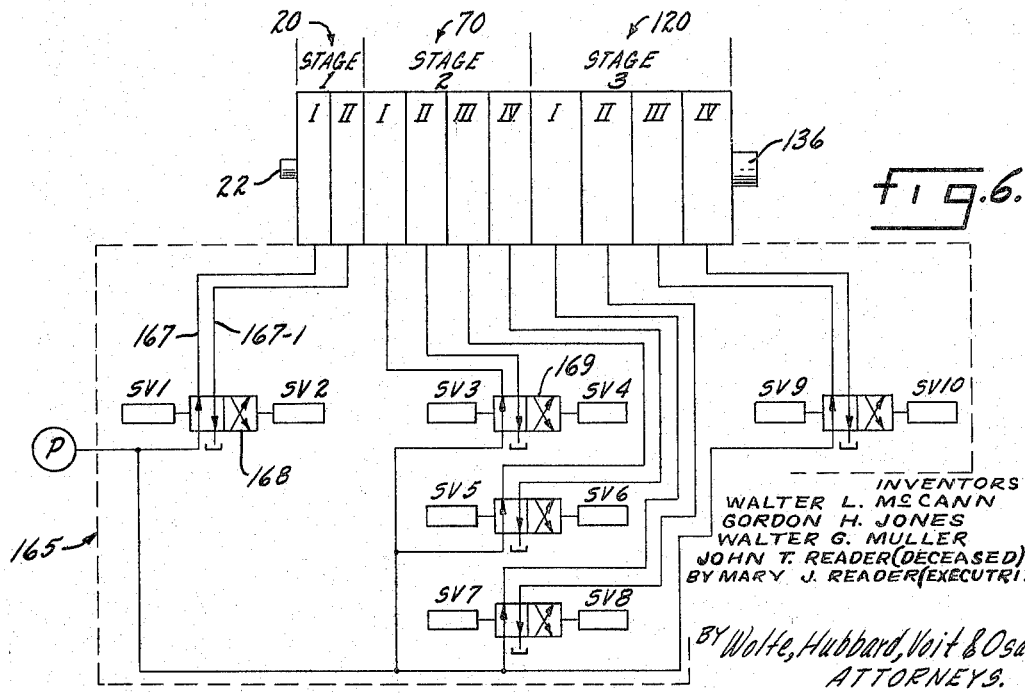

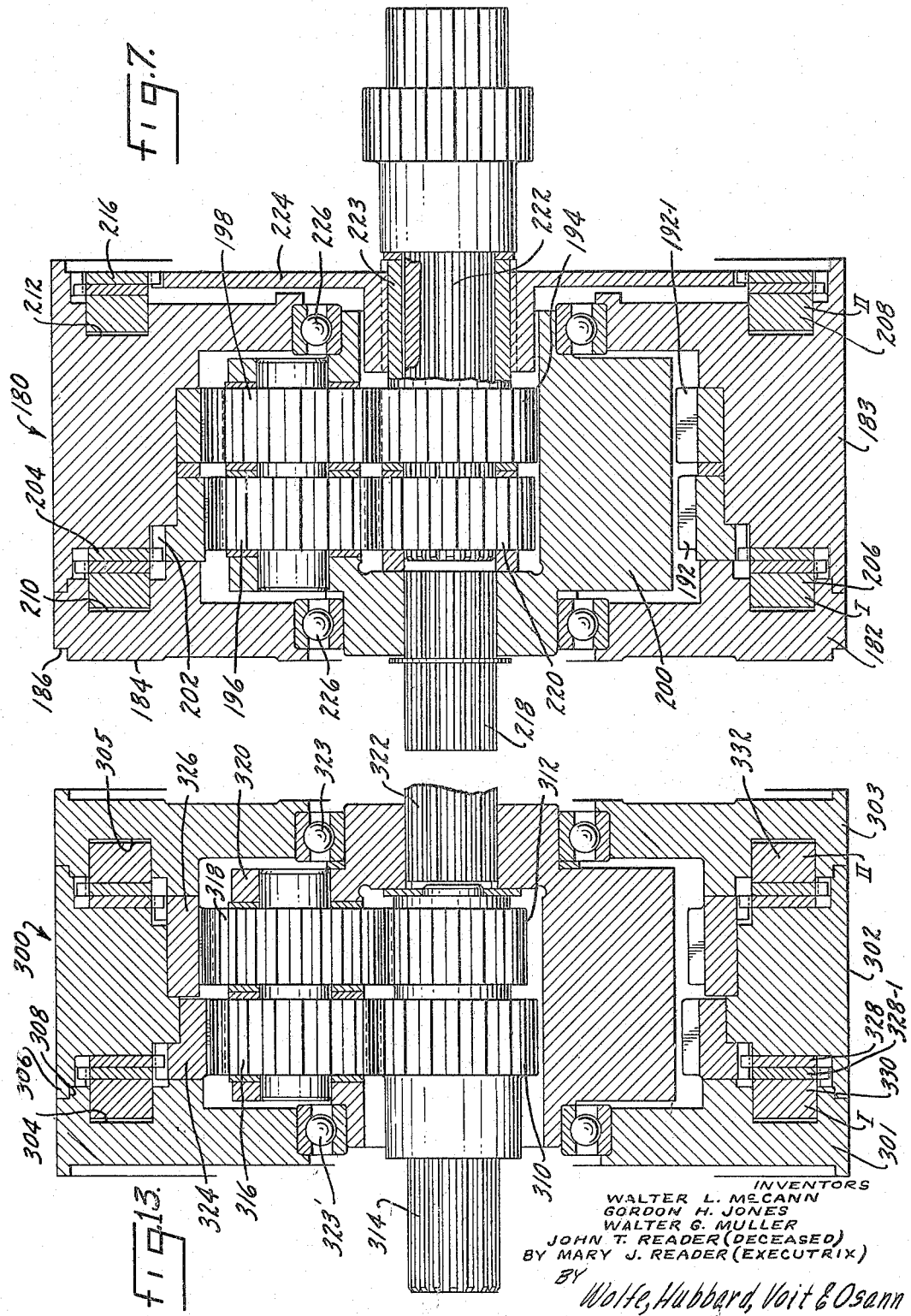

INVENTORS
WALTER L. McCANN
GORDON H. JONES
WALTER G. MULLER
JOHN T. READER (DECEASED)
BY MARY J. READER (EXECUTRIX)

BY Wolfe, Hubbard, Voit & Osann
ATTORNEYS.

Dec. 13, 1966  W. L. McCANN ETAL  3,290,962
PLANETARY TRANSMISSION
Filed Oct. 17, 1962  8 Sheets-Sheet 6
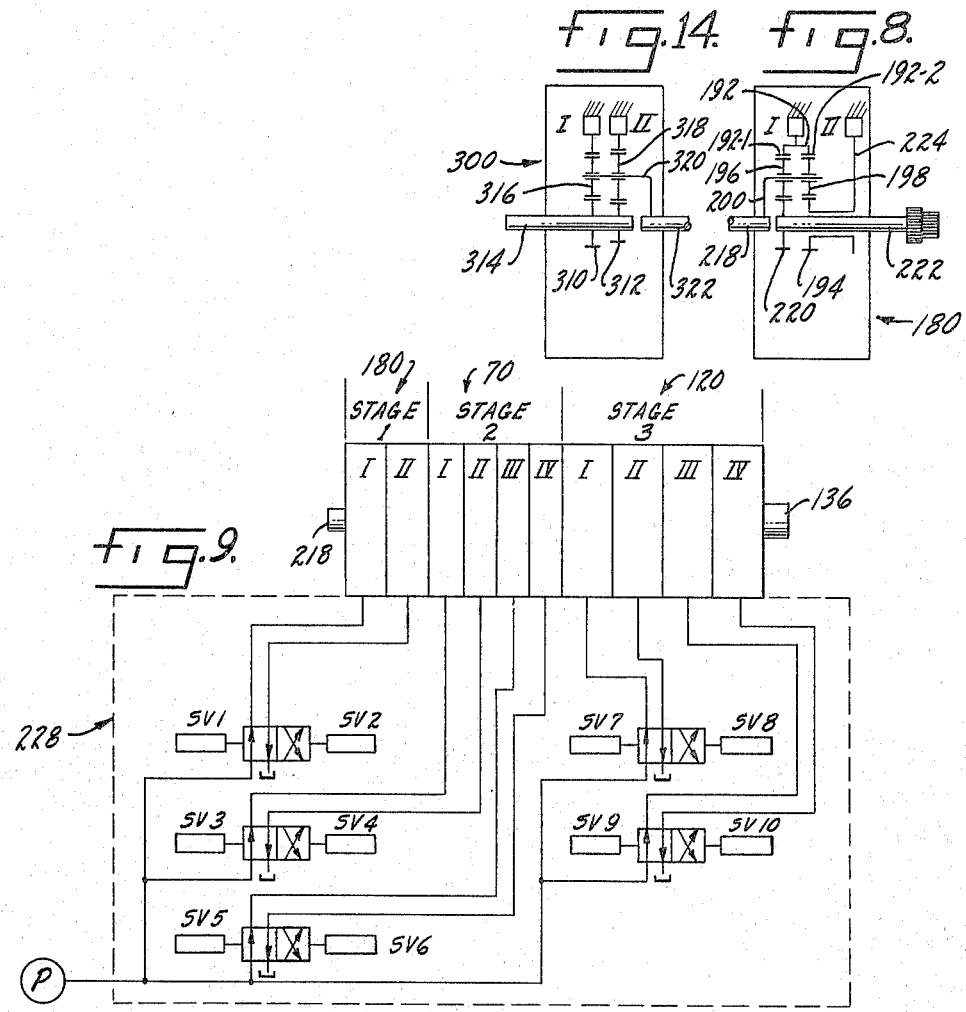
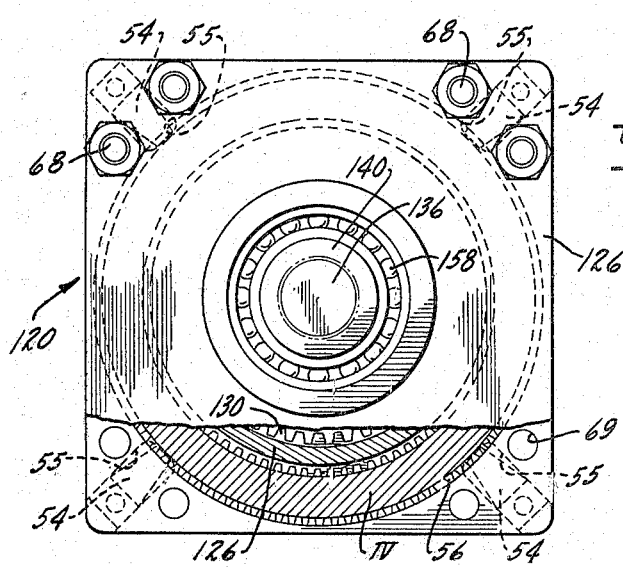
INVENTORS
WALTER L. McCANN
GORDON H. JONES
WALTER G. MULLER
JOHN T. READER (DECEASED)
BY MARY J. READER (EXECUTRIX)
BY Wolfe, Hubbard, Voit & Osann
ATTORNEYS.

Dec. 13, 1966 W. L. McCANN ETAL 3,290,962
PLANETARY TRANSMISSION
Filed Oct. 17, 1962 8 Sheets-Sheet 7
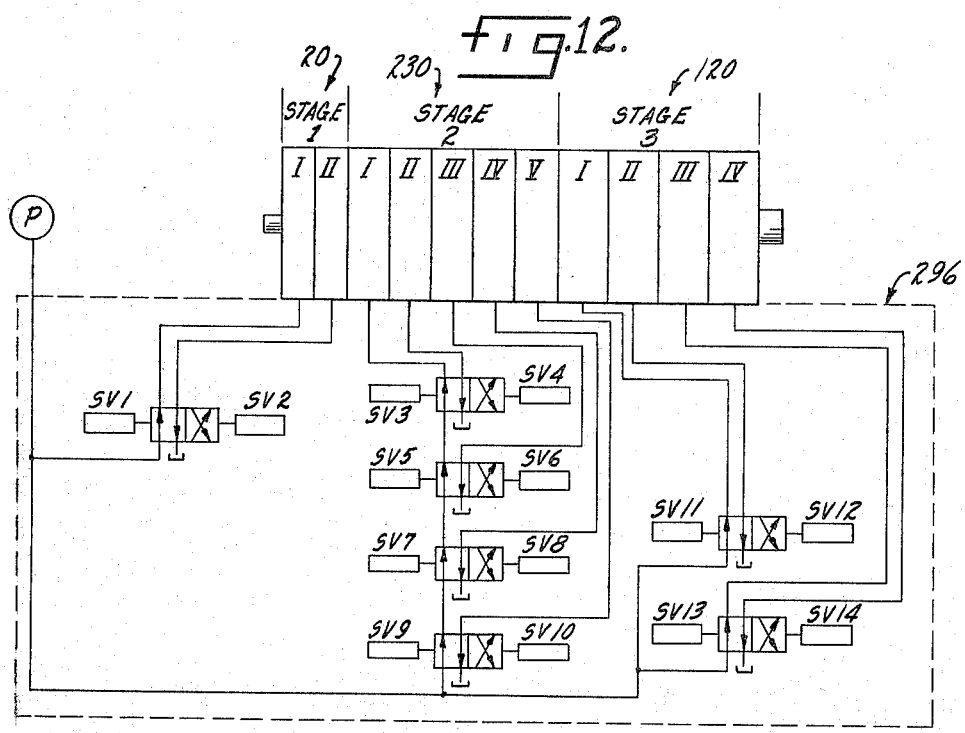
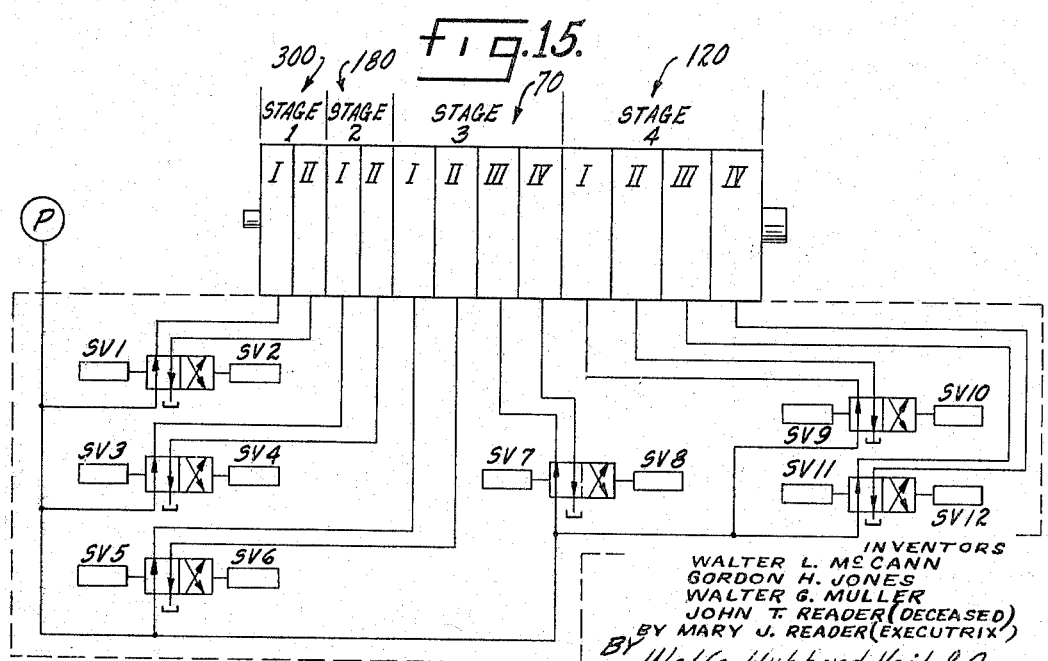
INVENTORS
WALTER L. McCANN
GORDON H. JONES
WALTER G. MULLER
JOHN T. READER (DECEASED)
BY MARY J. READER (EXECUTRIX)
BY Wolfe, Hubbard, Voit & Osann
ATTORNEYS.

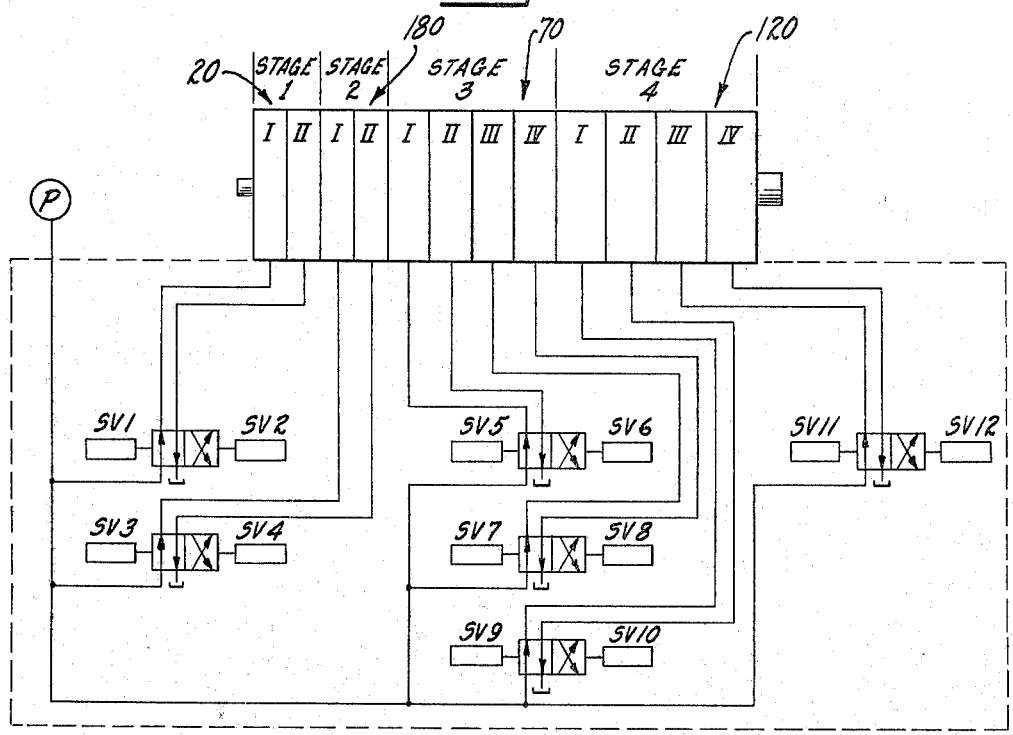
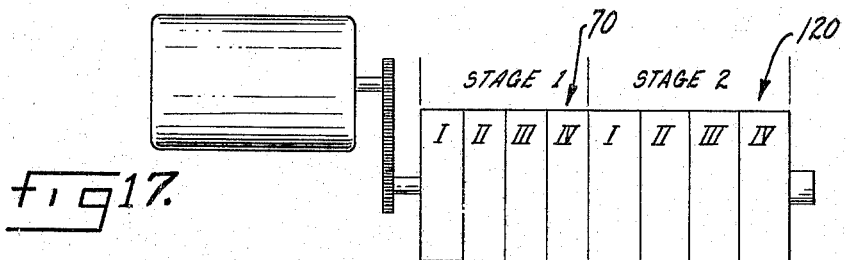
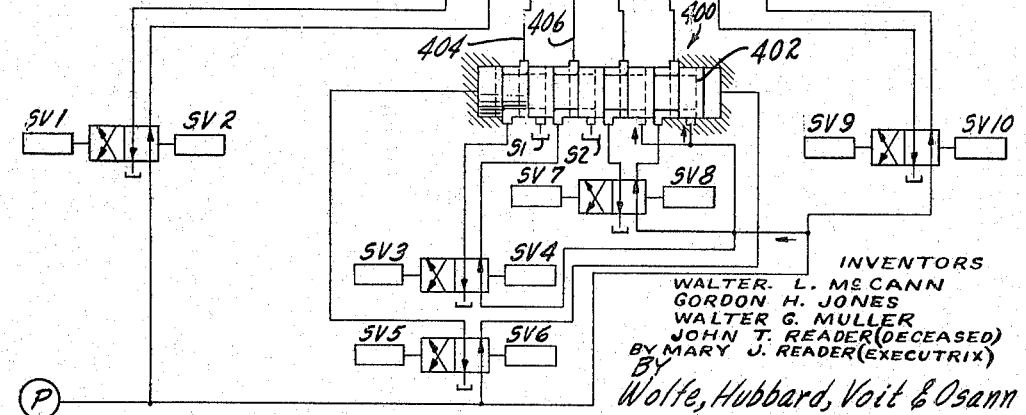

United States Patent Office 3,290,962
Patented Dec. 13, 1966

3,290,962
PLANETARY TRANSMISSION
Walter L. McCann and Gordon H. Jones, Fond du Lac, Wis., Walter G. Muller, Baden, Vienna, Austria, and John T. Reader, deceased, late of Fond du Lac, Wis., by Mary J. Reader, executrix, Fond du Lac, Wis., assignors to Giddings & Lewis Machine Tool Company, Fond du Lac, Wis., a corporation of Wisconsin
Filed Oct. 17, 1962, Ser. No. 232,339
11 Claims. (Cl. 74—760)

This invention relates to improvements in transmissions and particularly to improvements in planetary transmissions for use in machine tools.

The main objective of the present invention is to provide means for standardizing on a limited number of transmission units for a wide range of machine tool applications. Heretofore, it has been the practice in building machine tools to provide special transmissions for each type and size of tool. It is now proposed to provide a family of a limited number of different transmission units with each unit so constructed that it may be assembled with one or more other units to obtain multistage transmissions capable of satisfying widely different speed ratio and horsepower requirements. In this manner, transmissions have been constructed for a relatively large number of different machine tools from a relatively few standard transmission units.

A further object is to provide common control means for multistage planetary transmissions comprised of a plurality of individual transmission units.

Another object is to provide planetary units for assembly into multistage transmissions, each unit being sectionalized to facilitate such assembly and to provide access to the mechanisms of the transmission.

A related object is to provide planetary units for assembly into multistage transmissions utilizing brakes for actuating the reaction members of such planetary units.

Another object is to provide planetary transmissions affording a large plurality of different speed ratios with relatively few sets of gears.

Another object is to provide such planetary transmission units with means for coupling the housings of said units in fixed relation and wherein the planetary gears of such units are brought into drive relation as an incident to bringing the housings of the units into abutting relation.

A further object is to provide interchangeable transmission units for all stages of such transmissions so as to provide a wide range of available speed ratios and output torque characteristics.

Other objects and advantages will become apparent as the following description proceeds, taken in connection with the accompanying drawings, wherein:

FIGURES 1 and 2, taken together, show a longitudinal section through an exemplary three-stage transmission constructed in accordance with the invention;

FIG. 1A is an end view of the transmission shown in FIGURES 1 and 2, with a portion broken away as indicated by 1A—1A in FIG. 2;

FIG. 3 is a diagrammatic illustration of the three-stage transmission of FIGURES 1 and 2;

FIG. 4 is a transverse diagrammatic view for illustrating the relation of the sun, planet and ring gears of the first stage unit of the three-stage transmission of FIGURES 1 and 2, and is taken as indicated by the lines 4—4 in FIG. 3;

FIG. 5 is a transverse diagrammatic view for illustrating the relation of gears of the second stage unit of the three-stage transmission of FIGURES 1 and 2, and is taken as indicated by the lines 5—5 in FIG. 3;

FIG. 6 is a schematic illustration of the transmission of FIGURES 1 and 2 including a control system therefor;

FIG. 7 is a longitudinal section through a two-speed transmission unit which can be used in place of the first stage unit of the multistage transmission of FIGURES 1 and 2 or added to a three unit to make a four-stage unit;

FIG. 8 is a diagrammatic illustration of the transmission unit of FIG. 7;

FIG. 9 is a schematic illustration of a three-stage transmission including a control system therefor;

FIG. 10 is a longitudinal section through a five-speed transmission unit interchangeable with the second stage of a three-stage transmission shown in FIGURES 1 and 2;

FIG. 11 is a diagrammatic illustration of a five-speed transmission unit shown in FIG. 10;

FIG. 11A is a transverse diagrammatic view for illustrating the relation of gears of the unit shown in FIG. 11, and is taken as indicated by the lines 11A—11A in FIG. 11;

FIG. 12 is a schematic illustration of a three-stage transmission unit including a control system therefor;

FIG. 13 is a longitudinal section through a two-speed transmission unit which can be used in place of the first stage unit of the transmission of FIGURES 1 and 2 or can be added to a three-stage unit to make a four-stage unit;

FIG. 14 is a diagrammatic illustration of the transmission unit of FIG. 13;

FIG. 15 is a schematic illustration of a four-stage transmission including a control system therefor;

FIG. 16 is a schematic illustration of a further four-stage transmission including a control system therefor; and FIG. 17 is a schematic illustration of a two-stage transmission and control system therefor.

While the invention is susceptible of various modifications and alternative constructions, a preferred embodiment has been shown in the drawings and will be described below in considerable detail. It should be understood, however, that there is no intention to limit the invention to the specific form disclosed, but, on the contrary, the intention is to cover all modifications, alternative constructions, and equivalents falling within the spirit and scope of the invention as expressed in the appended claims.

I. GENERAL ORGANIZATION OF AN EXEMPLARY MULTISTAGE (3 STAGE) TRANSMISSION

Upon more specific reference to the drawings, it will be seen that the invention is there exemplified in FIGURES 1 and 2 in a multistage planetary transmission, herein shown as a three-stage transmission. In general, such transmission comprises three transmission units each constructed in accordance with the invention and assembled in fixed axial relation to form the three stages of the transmission. In the present case the first stage unit provides forward and reverse drive, the second stage unit provides four different speed ratios, and the third stage unit provides four further speed ratios, such that this three-stage transmission provides sixteen different speed ratios, and forward and reverse.

While this exemplary transmission comprises three units having the foregoing specifications, as will be explained more fully hereinafter, this invention contemplates the provision of other transmission units which may be interchanged with each of these three transmissions units (stages 1, 2 or 3) and further contemplates the addition of further units to construct transmissions with four or more stages.

Returning, however, to the three-stage transmission of FIGURES 1-3, the transmission input shaft extending from the left-hand end of the transmission as viewed in FIGURE 1, and the output shaft extending from the right-hand end of the transmission (FIG. 2) may be coupled in any suitable way to machine tool members or to driving means. Each unit of the transmission has a planetary gear train supported in an elongated sectionalized housing. Coupling shafts between the unit connect the planetary trains in torque transmitting relation. Each planetary gear train has associated therewith a plurality of selectively actuable brakes. By means of such brakes the reaction members (sun or ring gears) of each planetary gear train may be selectively actuated to provide direct drive or drive at a particular selected speed ratio through the respective planetary train.

In the present instance, the first stage forward-reverse unit, in keeping with the invention, is constructed with two brakes associated with separate reaction gears such that forward drive is obtained with the forward brake energized, and reverse drive is obtained with the reverse brake energized.

The second stage, four-speed unit, shown in FIGURE 1, is an example of planetary input gearing designed to operate at fairly high rotational speeds (1500–4000 r.p.m.) prevailing at the input end of the transmission. This unit includes four brakes associated with reaction members and selectively actuable to obtain four different speed ratios. The third stage unit is an example of planetary output gearing, constructed to operate at somewhat lower speeds and concomitant higher torques. This unit also includes four brakes selectively actuable to produce four different speed ratios. The housings of all three stages are constructed of stacked similar annular sections fixed together by means of longitudinal bolts which extend through registering openings in the housing sections.

As an incident to the bringing of the housings of adjacent units into mutual engagement, a common coupling shaft is brought into drive relation with the planetary gear trains of both units to couple such planetary gear trains in torque transmitting relation. This coupling shaft, as shown in FIGURES 1 and 2, in each case is without direct bearing support in either housing and thus is free to float in both transmission units for alignment and load distribution purposes. As will be explained more fully below, means are also provided for aligning adjacent units in axial relation.

*Forward-reverse transmission unit*

Turning now to FIGURE 1, which illustrates in detail a forward-reverse transmission unit 20, and FIGS. 3 and 4, which illustrate this unit diagrammatically, it will be seen to include a planetary gear train having a sun gear 21, which serves as the driving gear of the planetary train, fixed to the input shaft 22, and a carrier 24, which serves as the driven member of the train, fixed to the output shaft 26. The carrier 24 supports two sets of planet gears 28 and 30. A first set of planet gears 28 is intermeshed with the driving sun gear 21 and with the other set of planet gears 30, as shown in the diagrammatic view of FIG. 4. This latter set of planet gears 30 is also intermeshed with a reaction sun gear 32 which may be braked to the housing by an annular hydraulically actuated brake mechanism I, herein called the first brake because of its respective location in the housing. The planetary gear train also includes a reaction ring gear 36 which is selectively braked to the housing by an annular hydraulically actuated brake mechanism II herein called the second brake, which ring gear 36 is intermeshed with the planets of the second planet set 30.

With the sun gear 32 braked to serve as the reaction member for the planetary train, by energizing the first or forward brake I, the planetary train drives the output shaft 26 forwardly at a 2:1 reduction speed ratio. With the sun gear 32 unbraked and the ring gear 36 braked by energizing the second or reverse brake II so that the ring gear serves as the reaction member, the output shaft 26 is driven in the reverse direction at the same (2:1 reduction) speed ratio. These speed ratios are set forth in the following table:

TABLE 1

| Brake | Ratio |
| --- | --- |
| I | 2:1 Forward |
| II | 2:1 Reverse |

The unit just described may, however, be assembled opposite to the way it is shown in FIG. 1 so that the input serves as the output shaft and vice versa. This will provide a 2:1 updrive forward and a 2:1 updrive in reverse where such ratios are preferred over the reduction ratios given in Table 1.

In keeping with one of the important features of the invention, as will appear from FIGURE 1, the housing for the forward-reverse transmission unit 20 is layered or sectionalized and comprises a pair of annular sections or layers 40, 41 defining a main cavity 42 for the planetary gear train. The housing is closed at the input end by a plate 44. In the first annular layer or housing section 40 facing the plate 44 there is defined an annular groove 46 spaced inwardly a small radial distance from the outer surface of the housing. This groove 46 forms a hydraulic cylinder in which an annular piston 48 is mounted. The piston 48 engages a plurality of annular brake rings 50, herein shown as two rings 50, 50–1. The ring 50–1 spaced from the piston 48 is freely rotatable and has teeth 51 on its inner edge which engage teeth on the outer edge of an annular braking member 52 for the reaction sun gear 32. The other ring 50 is fixed against rotation by teeth 53 intermeshed with teeth on the housing layer 40, yet is movable axially, thereby holding the piston against rotation in addition to serving as a friction plate.

Referring also to FIG. 1A, every brake assembly in the transmission includes a set of leaf springs 54 which are fixed in slots 55 in the housing sections and bear against an annular brake ring 56 corresponding to the ring 50, in the direction to return the associated brake piston upon drop in pressure of the actuating fluid, thereby to release the brake. The braking action is achieved by admitting fluid behind the piston 48, thereby forcing the brake rings into mutual engagement and locking the rotatable ring 50–1 against rotation.

When the brake I is energized, the associated reaction sun gear 32 is held against rotation. To connect the brake I to the sun gear 32, the latter is fixed to a sleeve 32' from which projects an annular flange or ring which forms the braking member or ring 52. The ring 52, sleeve 32' and reaction sun gear 32 form an assembly through which the input shaft 22 is inserted and, with the forward brake I energized, the input shaft rotates therein.

The input shaft 22 is supported by a bearing 57 in the face plate 44 and by the sun gear 21. The carrier 24, which is the driven member of the planetary train, is supported by the housing. The carrier 24 is splined to the output shaft 26 which couples the planetary trains of the first and second transmission stages and thus comprises the coupling shaft between these stages.

It will be seen that with the layered or sectionalized construction used for the housing of the forward-reverse unit 20, the second or reverse brake II is between annular housing layers or sections 40, 41 and, like the first brake, the second brake includes an annular piston 60 slidable axially in an annular groove 62 between the layers forming a cylinder and, upon actuation, forces into mutual engagement a pair of brake rings 64 and 64–1. Such brake rings 64 and 64–1 are annular in form and may be made of any suitable material, preferably bearing material, such as bronze, and have teeth 65 and 66 on their outer and inner edges, respectively, which engage teeth on the housing 40 and on the reaction ring gear 36, respectively. The ring gear 36, in turn, is intermeshed with the second set of planet gears 30 and forms a reaction member for the planetary train with the second brake II energized.

Longitudinal locking bolts 68 passing through (FIG. 1A) registering openings 69 in the housing sections hold the latter in rigid assembled relation.

*Four-speed input unit*

Still referring to FIGURE 1, it will be seen that in keeping with the invention the forward-reverse unit 20 just described is coupled to a transmission unit forming stage 2 of the three-stage transmission, herein shown as a four-speed input unit 70, so designated because of its suitability for operation at relatively high input shaft speeds and lower torque in the input end of the transmission. It will be understood, however, that this four-speed unit 70 is suitable for other applications than the specific one disclosed; one of the main advantages of the present invention is the suitability of the individual transmission units for employment separately for drive units or together with other units to form multistage transmissions, and the interchangeability of the units to make for greater flexibility in transmission construction and application.

Thus the second stage unit 70 carries forward the construction mode described previously for the forward-reverse first stage unit 20. It includes, as shown in FIGURE 1, a housing formed by stacked annular layers or sections, 71, 72, 73, 74 defining a main cavity 76 for a planetary gear train. The layers or sections are held in abutting assembled relation by the previously mentioned circumferentially spaced long, locking bolts 68 which pass through registering openings 69 in the housing sections. Such bolts extend the entire length of the transmission through the housing sections of all three stages having means at both ends, herein shown as nuts, for rigidly fixing the housing sections in assembled relation.

The four-speed transmission unit 70 of FIGURE 1 forming stage 2, includes four brakes I, II, III, IV which, when energized as set forth in the table below, provide certain specified input to output speed reduction ratios.

TABLE 2

| Brake | Ratio |
| --- | --- |
| I and IV | 1:1 |
| II and IV | 1.5:1 |
| I and III | 2:1 |
| II and III | 3:1 |

Each brake is located between annular sections of the housing. Referring to the first brake I which is typical, as shown in FIGURE 1, said brake includes an annular piston 78 axially movable in a cylinder defined by a groove 79 formed between the first and second housing sections 71, 72. The piston 78 upon actuation forces into frictional engagement the toothed brake rings 80 and 80–1 whereby to lock reaction member 82 of the planetary train against rotation. Similar actuating pistons of brakes II, III and IV will lock other reaction members, herein shown as ring gears 83, 84 and a sun gear 85, of the planetary train. The return springs 54 shown in FIG. 1A are included in every brake assembly.

Referring also to FIGS. 3 and 5, which illustrate diagrammatically the second stage planetary gear train, it will be seen that the shaft 26 couples the stage 2 unit 70 at its input end to the preceding stage 1 forward-reverse unit 20 and carries axially arranged sun gears 86, 87, one of which serves as the driving member of the train according to whether the first or second brake is energized. This stage 2 unit 70 is coupled to the third stage unit by a coupling shaft 88 between the second and third stages of the transmission.

The planetary train of this unit 70 includes a common carrier 89 for a plurality of sets of planet gears 90, 91, 92, 93 associated with the reaction members 82, 83, 84, 85, respectively. Such sets of planet gears include in the present case three planet sets 90, 91, 92 mounted on the same pin 96 and intermeshed with the two driving sun gears 86, 87 and a driven member sun gear 98, respectively, the latter being fixed to the coupling shaft 88. The gears of the fourth planet set 93 are intermeshed with the reaction member sun gear 85.

The reaction ring gears 82, 83, 84 are selectively locked by the first, second and third brakes (I, II, III), respectively. The reaction sun gear 85 is adapted to be braked to the housing by the fourth brake IV; the latter is located farthest to the right hand as shown in FIG. 1 and thus toward the forward end of the unit 70 and is connected to the reaction sun gear via a sleeve 102 to which the sun gear 85 is affixed and an annular ring or plate 104 which extends radially from the sleeve and carries teeth 106 around its periphery which are engaged with the brake ring teeth 108.

The carrier 89 of the planetary train is rotatably supported in the second stage housing adjacent both of its ends by ball bearings 110. The driving sun gears 86, 87 on the shaft 26 coupling the forward-reverse first stage unit 20 and the second stage unit 70 are intermeshed with two of the planet sets on the carrier 90, 91, respectively, which provide support for the coupling shaft 26 which is without direct bearing support from the second stage housing and thus is free to float for alignment purposes. Similarly, the driven sun gear 98 which is affixed to the shaft 88 coupling the second and third stages, is intermeshed with one set of planet gears 92 on the second stage carrier 89 such that the coupling shaft is floatably supported therein, and is free from direct bearing support in the second stage housing.

The first and second stage housings are mechanically fixed by the locking rods 68 and are aligned in a rotational sense by the arrangement wherein the locking rods pass through registering openings in the housing sections. Axial alignment is obtained in the present case by means on the abutting housing faces, herein shown as an annular lip 112 projecting forwardly from the front face of the first stage housing and received in an annular groove 114 in the rearward face of the second stage housing. Similar alignment ends are served between each housing sectional layer of all units by forming one section with a lip and the meeting section with a groove, as appears in FIGURE 1.

*Four-speed output unit*

The third stage (FIG. 2) of the exemplary transmission is formed in the present case by a four-speed unit 120. This unit 120, like the units forming the first two stages, includes a housing constructed of annular sections 121, 122, 123, 124, 125 and a forward face plate 126 which are held in assembled relation by the axially arranged locking bolts 68 which extend the full length of the transmission. The third stage unit 120 includes four brakes I, II, III, IV which are selectively operable to lock reaction ring gears 127, 128, 129, 130 and are located in annular cavities between the housing sections. The main central cavity 131 defined by these annular sections communicates at the left end of the unit, as viewed in FIG. 2, with the main central cavity 76 of the second stage unit 70. The coupling shaft 88 passes from the second to the third stage without direct support from the housings but the sun gear 98 fixed thereto, and the axially spaced sun gears 132, 134, likewise fixed thereto, which are floatably supported in the planetary gear trains of both stages, support the coupling shaft 88. This provides for automatic alignment and load distribution to the planet gears. One of the sun gears 132 or 134 serves as the driving member of the stage 3 planetary train according to which of the first or second brakes I, II of stage 3 is energized.

Stage 3 includes the output shaft 136 of the transmission which carries a sun gear 138 and is splined to a carrier 140. The sun gear 138 or the carrier 140 fixed to the output shaft will serve as the driven member of the third stage planetary gear train according to whether the third or fourth brakes III, IV, respectively, of the stage 3 are energized, as will appear from FIG. 3.

The planetary train organization may most readily be described by referring to FIG. 3 from which it will be evident that the first driving sun gear 132 is intermeshed with a set of planet gears 142 carried by a first carrier 144. These planet gears 142 are, in turn, intermeshed with the first reaction ring gear 127. With brake I actuated, the reaction ring gear 127 will be locked up to transmit torque through the gear train and rotate the carrier 144.

The planet carrier 144 carries a driving sun gear 148 which serves with the first brake I actuated as a driving gear for a second carrier 150. The second carrier 150 is a common carrier for three additional sets of planet gears 152, 153, 154. The first set of such planet gears 152 on this carrier 150 is intermeshed with the driving sun gear 148 fixed in the carrier 144 for the preceding set of planet gears 142 and is also intermeshed with a ring gear 156 fixed in the housing. The second set of planet gears 153 on the common carrier 150 is intermeshed with the driving sun gear 134 on the coupling shaft 88 and it will be noted that with the first brake I energized to brake the reaction ring gear 127 to the housing, the common carrier 150 will be driven at a relatively slow speed through the driven member sun gear 148. The driving sun gear 134 on the coupling shaft turns the carrier 150 directly through the planet gears 153 intermeshed therewith with the first brake I deenergized and the second brake II energized to cause the second ring gear 128 to serve as the reaction member.

It will be observed that while the first brake I of stage 3 has, like the brakes of previous stages, a pair of brake rings 155, 155–1, the other brakes of stage 3 (II, III, IV) each include four brake or friction rings: 156 to 156–3. The larger number of friction rings provides a brake assembly capable of operating at the higher torques encountered at the output end of the transmission. The rotation of the carrier 150 causes the output shaft 136 to be driven via either the sun gear 138 or the planetary gear train 157 having the carrier 140 according to whether the third or fourth brake III or IV is actuated.

The operation of the planetary train of the third stage unit 120 will be evident, it is believed, from FIG. 3 taken in connection with the following table in which the input to output speed ratios (reduction) are given for the various combinations of the brakes of the third stage unit.

TABLE 3

| Brake | Ratio |
| --- | --- |
| I and IV | 64:1 |
| II and IV | 16:1 |
| I and III | 4:1 |
| II and III | 1:1 |

The coupling shaft 88 is supported without direct bearing support in the third stage housing. The sun gears 132 and 134 carried thereby are free to float in the planetary train thereby distributing the load. The output shaft 136 is splined in the carrier 140 which is supported in a ball bearing 158 carried by the plate 126. The left-hand end of the output shaft at a significant distance from the fixed condition of the right-hand end is allowed to float and be supported by the meshing of driven sun gear 138 and planet gears 154 thus allowing the driving torque to be distributed by the plurality of planet gears.

Each of the individual housing sections 121, 122, 123, 124 and 125 is aligned with the neighboring section by means on the abutting faces including, as for example, in the case of the first two sections 121, 122, an annular lip 160 received in an annular groove 162. The second and third stage housings are aligned with each other in a similar manner. Rotational alignment is obtained by the longitudinal locking bolts 68 which extend the length of the transmission housing through each of the sections thereof.

*Control for three-stage transmission*

The three-stage transmission of FIGURES 1–3 includes ten brakes, four in each of the second and third stages and two in the first stage, which are selectively operable to obtain sixteen transmission ratios as well as a choice between forward and reverse. The input-output speed ratios are shown in the following table along with the brakes which are required to be actuated to produce a particular speed ratio. This table omits the first stage brake designations since for forward drive the first brake I will be energized, and for reverse drive the second brake II will be energized for any one of the different speed ratios. It will be further noted that the input to output ratio as given in the table accounts for the 2:1 speed reduction of the first stage.

TABLE 4

| Brake | | Speed Ratio |
| --- | --- | --- |
| Stage 2 | Stage 3 | |
| I and III | II and III | 2:1 |
| II and III | II and III | 3:1 |
| I and IV | II and III | 4:1 |
| II and IV | II and III | 6:1 |
| I and III | I and III | 8:1 |
| II and III | I and III | 12:1 |
| I and IV | I and III | 16:1 |
| II and IV | I and III | 24:1 |
| I and III | II and IV | 32:1 |
| II and III | II and IV | 48:1 |
| I and IV | II and IV | 64:1 |
| II and IV | II and IV | 96:1 |
| I and III | I and IV | 128:1 |
| II and III | I and IV | 196:1 |
| I and IV | I and IV | 256:1 |
| II and IV | I and IV | 384:1 |

Referring in particular to FIG. 6 it will be seen that the transmission brakes are controlled by solenoid valves SV1 to SV10 which are herein shown in a manifold 165 which also includes passages leading from a source of pressure fluid P to the respective brake cylinders.

The forward and reverse brakes of the first stage 1 unit 20 are connected via manifold passages 167 and 167–1 to a 4-way, 2-position valve 168 shown schematically in FIG. 6 as comprising solenoids SV1, SV2. With the forward solenoid SV1 associated with this valve energized, as shown, and the reverse solenoid SV2 deenergized, the valve is in position to convey pressure fluid to the first, forward brake to energize the latter, and to deenergize the second, reverse brake by connecting the latter to the tank. The reverse brake will be energized by deenergizing the solenoid SV1 and energizing the reverse solenoid SV2.

As shown in Tables 2 and 3 above, the other brakes of the transmission are operated in a similar manner in pairs. Thus, the first and second brakes I, II of the second stage 2 are controlled by a 4-way, 2-position solenoid shown in position with the first brake solenoid SV3 energized to supply pressure fluid to the first brake I to actuate the latter. With the valve 169 in this position, the second brake II is deenergized and the cylinder thereof is connected to tank. The second brake II may be actuated by deenergizing SV3 and energizing SV4. It will be observed that the third and fourth brakes III, IV of this second stage 2 are connected in similar fashion to a 4-way, 2-position valve having solenoids SV5, SV6. It will also be observed that the first and second brakes, I, II of the third stage 3 are connected to a 4-way, 2-position valve having solenoids SV7, SV8, and the third and fourth brakes III, IV of that stage 3 are connected to a further similar 4-way, 2-position solenoid operated valve having solenoids SV9, SV10. With the brakes operated in pairs, as shown, one, but not both, of any pair may be energized to provide any specified speed ratio. The speed ratios obtainable by the various combinations of brakes are shown in Table 4. A common control system is thus provided for the three-stage transmission comprised of separate transmission units assembled together in a single transmision, and a large plurality of different speed ratios (herein shown as sixteen different speed ratios) is obtainable with simple controls in the form of five individually actuable solenoid valves. The controls, moreover, may be located at a remote location and may be connected through lines to the transmission manifold.

The three-stage transmission of FIGURES 1–3 will find particular, but not exclusive, utility as a spindle feed transmission in a machine tool such as a horizontal boring mill. In such application, the input to output speed ratio as given in Table 4 have provided, using conventional lead screws and countershaft gearing, feed rates in the order of from 140″ per minute to 0.012″ per minute.

II. INTERCHANGEABLE UNITS FOR MULTI-STAGE TRANSMISSIONS

In accordance with an important feature of the invention, further transmission units are provided which are interchangeable with the three units previously described so as to provide transmissions with characteristics that may be required for specific machine tool applications, such as to provide a large plurality of input to output speed ratios, or to modify the previously specified transmission characteristics, such as input horsepower or output torque ratings, as will be set out more fully below. By means of the few different transmission units it becomes possible to produce a relatively large number of transmissions with particular input horsepower, or output torque ratings, or providing various speed ratios.

Two-speed unit

One such interchangeable unit is shown in detail in FIG. 7 and diagrammatically in FIG. 8. In the present instance, this is a two-speed unit 180 which is particularly, but not exclusively, adapted to be substituted for or interchanged with the forward-reverse unit 20 first stage of the transmission of FIGURES 1–3 in order to provide a multistage transmission having a very wide range of feed ratios including a very high ratio of speed reduction to produce very low output shaft speeds. As a further example, which will be described more fully later, the two-speed high reduction unit 180 is also adpted to be added to a three-stage unit to make a four-stage unit.

This unit provides two different speed ratios, and, when combined with the second and third stages of the multistage transmission of FIGURES 1–3, forms a transmission affording selection of thirty-two different speed ratios and, of particular importance, such ratios include speed ratios both higher and lower than those obtained with the three-stage transmission of FIGURES 1–3. Such transmission will find many applications in machine tools, and it is specifically adapted to be used with the table and spindle drives of a horizontal boring mill, where low creep feed rates will be desired.

This unit includes two brakes, termed the first and second brakes I, II, according to their relative location in the housing, and provides the following input to output speed ratios with the brakes energized as indicated.

TABLE 5

| Brake | Ratio |
|---|---|
| I | 1:4 Updrive |
| II | 16:1 Reduction |

Referring specifically to FIGS. 7 and 8, the construction of this two-speed unit carries forward the principles set forth above in connection with the multistage transmission units of FIGURES 1–3. Thus the unit has a sectionalized housing comprised of stacked annular sections 182, 183 which are held in assembled relation with axially arranged transmission units, such as the second and third stage units 70, 120 of FIGURES 1–3, in the same manner by means of locking bolts 68 that the forward-reverse unit 20 of the latter figures is assembled therewith. For alignment of adjacent units, the housing section 182 at the input face 184 of the unit 180 is shown in FIG. 7 with an annular groove 186 at its outer edge to cooperate with an annular lip in the abutting surface of a preceding stage transmission unit which may be added as will be explained below. This face 184 may be formed smooth to present a finished outward appearance as desired in the present case where the two-speed unit of FIG. 7 serves as the input unit of the transmission. Similar alignment provision is made between abutting sections 182, 183.

Between the housing sections 182, 183 annular grooves are formed to receive brake mechanisms for reaction members herein shown as ring gear 192 and sun gear 194. The planetary gearing within the unit includes two sets of planet gears 196, 198 supported on a common carrier 200 which serves as the driving member, and intermeshed respectively with sections 192-1, 192-2 of the reaction ring gear 192. The latter has teeth 202 around its outer surface engaged with teeth of brake rings 204, such that with the first brake I energized the ring gear 192 is locked to serve as the planetary train reaction member. Both brake mechanisms are similar with annular pistons 206, 208 defining grooves 210, 212 in the housing and engaging brake rings 204, 216 which cooperate with the reaction members 192, 194, respectively.

It will be seen from FIGS. 7 and 8 that the carrier 200 which serves as the driving member of the planetary gear train is fixed to the input shaft 218 of the unit. The driven member of the planetary train is sun gear 220 intermeshed with the first set of planet gears 196 and fixed to the shaft 222 which couples the planetary train of the unit to the following unit of the transmission. Where this unit 180 is interchanged with the forward-reverse unit 20 to serve as the first stage of the transmission, this coupling shaft 222 extends into the second stage unit planetary train and couples the first and second stage gear trains in torque transmitting relation.

The reaction sun gear 194 is rotatably supported between planet gears 198 and is connected to the second brake II by a sleeve 223 and annular ring or flange 224 having teeth about its outer edge which engage teeth on the brake ring 216. With the sun gear 194 fixed against motion by actuating the brake II, the ring gear 192 which is common to both sets of planet gears 196 and 198, is turned in the direction of rotation of the driving member carrier 200. By reason of the gear ratios existing between the two planet sets a differential output or speed reduction is applied to sun gear 220. The foregoing is achieved by providing different numbers of teeth on the two sections 192-1, 192-2 of the ring gear, and different numbers of teeth on the planet gears 196, 198 respectively meshing with such ring gear sections, and on the meshing sun gears 220, 194. Illustratively, one ring gear section 192–1 is provided with fifty-four teeth and the meshing planet gear 196 with eighteen teeth while the other ring gear section is provided with forty-eight teeth and the meshing plane gear 198 with sixteen teeth. The meshing sun gears 220, 194 have eighteen and sixteen teeth, respectively. This will provide a 1:16 speed reduction. Putting it another way, the gear ratios of the two gear sets are such that the planet gears 196 rotate at the same rate as the planet gears 198, but since the ratio between planet gears 198 and the reaction sun gear 194 is 16 to 15 while the ratio between planet gears 196 and the driven sun gear 220 is one to one (18 to 18), the resulting rotation of the driven sun gear 220 when the reaction sun gear 194 is fixed is 1/16 of the rate of the driving carrier 200. A 1 to 4 updrive is obtained by energizing brake I and releasing brake II. Brake I locks ring gear 192 thereby effecting a 1 to 4 updrive between carrier 200 and pinion 220. As shown in Table 5, an overall speed range of 64:1 is provided with this unit.

The common carrier 200 for the planet sets is supported by a pair of ball bearings 226 in the housing. The shaft 222 coupling the present unit 180 and the second stage unit of the transmission where the latter is constructed as shown in FIGURE 1, is without direct bearing support in the housing but is free to float for alignment purposes.

*Control for three-stage transmission with two-speed input unit*

In FIG. 9 there is schematically shown a three-stage transmission and controls therefor. This three-stage transmission includes the two-speed unit of FIG. 7 which has been interchanged with the forward-reverse unit for the first stage of the three-stage transmission shown in FIGURES 1–3. This two-speed unit, when utilized as the first stage of such a transmission, has two brakes I, II which are controlled as a pair by valve means herein shown as a two-position solenoid valve operated by two solenoids SV1, SV2. With the second solenoid SV2 energized as shown, the second brake is operated to lock up the reaction sun gear 194 of the unit and thereby provide a 16:1 downdrive from the planetary gear train of the unit to produce a slow output shaft speed and a resulting low feed rate with the brakes of the other transmission units operated to provide an overall high reduction speed ratio for the transmission. A 4:1 updrive will be obtained from the first stage unit, of course, by energizing the first solenoid SV1 and thereby actuating the first brake.

The brakes of the second and third stages are operated in the same manner described previously in connection with FIG. 6, with the solenoids SV3 to SV10 of the valves each serving a brake. A manifold 228 supported on the side of the transmission housing carries the valves and provides passages connecting a source of pressure fluid P to the valves and to the brake cylinders.

*Five-speed unit*

As a further example of interchangeable transmission units constructed according to the invention, reference is made to FIG. 10 wherein is depicted a five-speed unit which is particularly, but not exclusively, adapted to be interchanged with the second stage of the transmission of FIGURES 1–3. The resulting three-stage transmission is shown schematically in FIG. 12 with the associated controls.

This transmission carries forward the same principles set forth above and includes five brakes numbered I–V according to their relative locations in the housing. The five-speed unit provides five different speed ratios by individually selectively energizing the brakes of the unit, which speed ratios are specifically required for feeding pipe taps. These input to output speed ratios are shown in the following table, with the brakes energized as indicated.

TABLE 6

| Brake | Ratio |
|---|---|
| I | 1:2 |
| II | 8:23 |
| III | 2:7 |
| IV | 2:9 |
| V | 4:27 |

Pipe taps, because of their tapered shape, require close feed control in order to prevent thread damage when retracting the tap from the hole. The three-stage transmission formed as shown in FIG. 12 will provide the requisite close feed control and when driven from the spindle drive at suitable shaft speed will provide feed rates bearing the requisite relation to the spindle feed. The transmission, including this five-speed unit and the four-speed third stage, provides twenty different speed ratios all with a choice of forward and reverse drive. The following table gives the graduated spindle feeds in inches per revolution of the spindle, and the threads per inch which will be produced at such speeds, with the twenty different speed ratios afforded by the transmission. It will be understood that the transmission is coupled to the feed screw and spindle drive through suitable countershaft gearing.

TABLE 7

| Spin. Feed, I Pr. | Thds. per Inch | Nominal Pipe Tap Size (in.) |
|---|---|---|
| .125 | 8 | 2½ to 4. |
| .087 | 11½ | 1–2. |
| .071 | 14 | ½–¾. |
| .056 | 18 | ¼–⅜. |
| .037 | 27 | ⅛. |
| .031 | 32 | |
| .022 | 46 | |
| .018 | 56 | |
| .014 | 72 | |
| .0093 | 108 | |
| .0078 | 128 | |
| .0054 | 184 | |
| .0045 | 224 | |
| .0035 | 288 | |
| .0023 | 432 | |
| .002 | 512 | |
| .0014 | 736 | |
| .0011 | 896 | |
| .0009 | 1,152 | |
| .0006 | 1,728 | |

Turning now to FIG. 10 for the details of the five-speed unit 230 it comprises a sectionalized housing adapted to be interchanged with the second stage unit housing, as shown in FIGURES 1–3, and for this purpose may be abutted at its left-hand end against the forward face of the forward-reverse unit 20 first stage (FIGURE 1). At its right-hand end the five-speed unit is adapted to be abutted against the third stage unit 180 (FIG. 2). An aligning lip 232 on the right-hand end of the housing for the present unit and an aligning groove 234 on the left-hand end as viewed in FIG. 10, cooperate with the adjacent unit housings for axial alignment purposes.

The housing for the unit in this case is made of six stacked annular sections 235, 236, 237, 238, 239, 240 which are held in assembled relation by axial locking bolts 68 extending the length of the complete transmission. Between each such section (for example, 235) and the adjacent section (236) an annular cavity 242 is formed for the brake mechanisms I–V, and each section is aligned with its neighbor in the same way as adjacent housings are aligned by projecting lips 244 and grooves 246 into which such lips are received.

Within the central bore defined in the housing for the unit is mounted a planetary gear train composed of five planetary gear sets each having a set of planet gears 247, 248, 249, 250, 251. Such planet gears are supported on a common carrier 252 which is rotatably journaled in the housing by ball bearings 254 and comprises the driven member of the planetary train being splined to the output shaft 256 which couples the train to the train of stage 3.

The input shaft 258 which couples the gear train of the stage 1 unit 20 to the planetary gear train of the present unit 230 has fixed thereto four axially spaced sun gears 260, 261, 262, 263 which are selectively actuable to serve as the driving gear for the train according to whether the second through the fifth brake II–V is energized, respectively. The first brake I is operative to lock up a sun gear 264 which is rotatable about the input shaft 258 and serves as a reaction member. The four driving sun gears 260–263 are intermeshed with the second through the fifth planet sets, 248–251, respectively. The first planet set 247, the left-hand set as viewed in FIG. 10, is intermeshed in pairs with the adjacent planet set 248 and with the reaction sun gear 264. The latter is connected by a sleeve 266 and flange 268 to the first brake I in the housing. The first brake mechanism I includes an annular piston 269 and annular ring members 270, 270–1 actuated by the piston with inner teeth on the member 270 meshed with teeth on the periphery of the reaction sun gear flange 268 so as to provide means for braking the sun gear 264. Ring 270–1 is coupled to section 235 by intermeshing clutch teeth.

The other brake mechanisms II–V are similarly constructed, but in all cases the annular brake rings 276–279 are operatively connected to associated ring gears 272, 273, 274, 275, respectively. This first ring gear 272 when braked to serve as a reaction member, causes torque to be transmitted from the first driving sun gear 260 on the input shaft 258 through the planet set 248 intermeshed therewith to the carrier 252, to drive the latter. With any one of the other reaction ring gears 273, 274 or 275 held to serve as the reaction member, torque is transmitted from the associated driving sun gear through the associated set of planet gears to rotate the carrier. In this manner the different speed ratios are obtained according to which brake I to V is energized.

The input shaft 258 as appears from FIG. 10, is without direct bearing support from the housing but is supported for alignment purposes by the gears carried thereby and the planet gears associated therewith. Similarly, the output shaft 256 is without direct bearing support but is fixed to the carrier 252.

*Controls for three-stage transmission*

Since the brakes of the five-speed transmission unit 230 shown in FIG. 10 are individually operated and not operated in pairs as in the case of the brakes of the units under the control of the systems previously described (FIGS. 6 and 9), the control system for the three-stage transmission including the five-speed unit is arranged as shown in FIG. 12 to account for this characteristic. Such control system includes a four-way solenoid valve SV1, SV2 for the brakes I and II of the first stage forward-reverse unit, which are operated as a pair. Similarly connected four-way valves SV11 to SV14 are employed for the brakes I–IV of the four-speed unit third stage, wherein such brakes are likewise operated in pairs. The foregoing valves are connected in the usual manner to the brakes by lines in a manifold 296 on the transmission housing. The manifold 296 and housing sections are provided with passages to convey and return pressure fluid from a pressure line connected to the pump P to and from the cylinders of the brake mechanisms. Four-way solenoid valves SV3 to SV10 hydraulically interconnected to prevent operation of more than one brake at a time are provided for the five brakes I–V of the second stage unit, as shown in FIG. 12. To actuate brake I of stage 2, the following solenoid valves are energized: SV9, SV7, SV5, SV3; to actuate brake II: SV9, SV7, SV5, SV4; to actuate brake III: SV9, SV7, SV6; to actuate brake IV: SV9, SV8; and to actuate brake V: SV10.

*Two-speed unit for graduated speed ratio changes*

As an example of a unit suitable for addition to multi-stage transmissions to provide intermediate steps in the overall speed spectrum, and as a further example of an interchangeable transmission unit constructed in accordance with the invention, reference is made to FIGS. 13 and 14 which depict a two-speed unit 300. This unit may be interchanged with the forward-reverse unit 20 of FIG. 1, and used with, for example, the four-speed input unit 70 shown as the second stage of a three-stage transmission in this figure, and with a suitable output unit such as output unit 120. It provides two speed ratios shown as input to output ratios in the table below, with one or the other of the brakes of the unit always energized.

TABLE 8

| Brake | Ratio |
| --- | --- |
| I | 1:4 |
| II | 1:4.8 |

The speed ratio steps provided by the two-speed unit 300 have a particular relationship which illustrates a feature of the invention applying to all transmission units herein disclosed; namely, the special suitability of all units for use in constructing a large number of different transmissions with a relatively few such units, each unit imparting a particular desired characteristic to the transmission. For example, the output unit 120 shown in FIG. 2 provides speed ratio steps which are whole number powers of the number 2 ($2^2$, $2^4$, $2^6$); the input unit 70 shown in FIG. 1 provides speed ratio steps which are graduated by approximately the ½ power of the number 2 ($2^{3/2}$, $2^{2/2}$, $2^{1/2}$); and the present unit 300 provides speed ratio steps graduated by approximately the ¼ power of the number 2 ($2^{9/4}$, $2^{8/4}$). It will thus be seen that by combining the input and output units (70, 120) with the present unit 300, a thirty-two step transmission may be provided wherein the speed ratio steps are substantially in geometric progression with ¼ power of the number 2 as the factor.

A transmission formed with this two-speed unit 300 and both four-speed units 70, 120 of FIGS. 1 and 2 will thus provide a total of thirty-two speed ratios by energizing different brake combinations, with intermediate steps in the sixteen speed ratio steps afforded by the four speed units 70, 120 of FIGS. 1 and 2, such that the graduation between steps is about 20%. It becomes further possible, as will appear below, to add a forward-reverse unit (such as the unit 20, FIG. 1) and thereby construct a four-stage transmission affording thirty-two speed ratios and the additional choice of forward and reverse drive. Limiting the present discussion, however, to a three-stage transmission comprised of the two-speed unit 300 as shown in FIG. 10, a four-speed unit 70 as shown in FIG. 1, and an additional four-speed unit 120 constructed as shown in FIG. 2, the thirty-two speed ratios which will be afforded by such a three-stage transmission are set forth in the following table. In this table the speed ratios in the left-hand column are those obtained by selectively energizing the brakes of the second and third stages as previously set forth in table No. 4, with the first brake I of the two-speed unit 300 energized. The second column gives the about 20% speed ratio change obtained by energizing the second brake II of the two-speed unit 300 and deenergizing the first brake I.

TABLE 9

| Ratios Using Stage (1) | |
|---|---|
| Brake I | Brake II |
| 4:1 | |
| | 4.8:1 |
| 6:1 | |
| | 7.2:1 |
| 8:1 | |
| | 9.6:1 |
| 12:1 | |
| | 14.4:1 |
| 16:1 | |
| | 19.2:1 |
| 24:1 | |
| | 28.4:1 |
| 32:1 | |
| | 38.4:1 |
| 48:1 | |
| | 57.6:1 |
| 64:1 | |
| | 76.8:1 |
| 96:1 | |
| | 115.2:1 |
| 128:1 | |
| | 153.6:1 |
| 192:1 | |
| | 230.4:1 |
| 256:1 | |
| | 307.2:1 |
| 384:1 | |
| | 460.8:1 |
| 512:1 | |
| | 614.4:1 |
| 768:1 | |
| | 921.6:1 |

Turning now to FIGS. 13 and 14 for the details of this two-speed unit 300, it will be seen that the housing is comprised of three annular sections 301, 302, 303 which are assembled together and held by axial locking bolts 68. Between the housing sections are defined annular cavities 304, 305 forming brake cylinders of the first and second brakes I, II. The housing sections are, as in the previously described transmission units, annular pieces with cooperating lips 306 and grooves 308 for alignment of the sections. Openings in the sections are registered to receive the locking bolts and afford a means for aligning the sections in a rotational sense.

Within the central bore defined by the housing is the planetary gear train of the unit, such train includes axially spaced sun gears 310 and 312 fixed on the shaft 314, one of the sun gears 310 or 312 serves as the driving member of the train according to which brake I, II is energized. Two sets of planet gears 316 and 318 are intermeshed with the sun gears 310, 312 respectively and are supported on a common carrier 320 which serves as the driven member of the planetary gear train and is fixed to the output shaft 322. The carrier 320 is journaled by bearing 323 in the housing, and also by bearing 323'.

The planet gears 316, 318 engage reaction ring gears 324, 326 which are rotatably mounted in the housing and associated, respectively, with the brakes I, II of this two-stage unit. The ring gears 324, 326 are journaled in the housing and have teeth around their outer edge which mesh with teeth on annular brake rings 328, 328–1 one of which (328–1) is fixed against rotation in the housing. The brakes include annular pistons 330, 332 which are moved into engagement with the adjacent brake rings upon admission of pressure fluid behind the piston in the cylinder.

The input shaft 314 carrying the driving sun gears 310 and 312 is without direct bearing support in the housing. Sun gears 310 and 312 which are carried by this shaft are floatably supported by their respective planet gears. The output shaft 322 is likewise without direct bearing support in the housing but is fixed to the carrier 320 and extends into the adjacent stage to serve as a coupling shaft for coupling the planetary train of such stages in torque transmitting relation.

*Four-speed unit*

As a further example of an interchangeable transmission unit constructed in keeping with the invention, reference is again made to FIG. 2. The unit 120 depicted therein has been described above as a preferred example of planetary output gearing and may be used as the third stage of several different three-stage transmissions (for example, FIGS. 3, 9, and 12). One of the important features of the present invention revolves about the interchangeability of the transmission units to obtain not only different speed ratios, but also to obtain various other transmission characteristics.

One such characteristic is horsepower or torque rating for the total transmission. It is advantageous to rate units at the input end of the transmission in terms of horsepower since an input unit of a given size may be suited at the relatively high rotational speeds (1500 to 4000 r.p.m.) prevailing at the input end of the transmission and relatively low torques for operation over a fairly wide horsepower range. The four-speed input unit 70 of FIG. 1 has been constructed, for example, to serve in transmissions rated at from 3 to 25 horsepower.

While the same size input transmission unit will serve in different transmissions all rated within such horsepower range, the same size output unit will not serve because at the higher horsepower end of such range a larger output transmission unit will often be required to transmit the relatively high torques at low output speeds. It is customary to rate output units in terms of output torque. It is contemplated, therefore, that the output transmission unit shown in FIG. 2 will be constructed in at least two sizes; a smaller size rated, for example, at 8400 in. lbs. output torque capacity, for use as the third or fourth stage output unit for transmissions constructed to be rated for use in the relatively low horsepower end of a given range, such as from 3 to 15 horsepower; and a larger size unit rated, for example, at 16,800 in. lbs. output torque capacity, having the same internal planetary train and brake mechanism arrangement, but with the elements of the train and the brake mechanism of larger size to transmit the torque imposed in transmissions rated for use in the higher horsepower (15–25) of the given range. The same input units will serve over the entire range (3–25) horsepower.

Specific mention was made in the foregoing of horsepower and torque ratings. It will be understood that the transmission units, as described hereinbefore, are suitable for operation at higher or lower ratings than those specifically set forth.

III. FURTHER APPARATUS EMBODIMENTS

*FIG. 15 multistage transmission*

Further in keeping with the invention, it is contemplated that a multistage transmission having four or more stages may be assembled with the transmission units heretofore described in detail. Referring, for example, to FIG. 15, this figure depicts diagrammatically a four-stage transmission employing the four speed units 70 and 120 of FIGURES 1 and 2 for the third and fourth stages, and the two speed units 300 and 180 of FIGS. 13 and 7 for the first and second stages, respectively. Such a transmission will provide thirty-two different speed ratios with about a 20% change between steps. The transmission also provides a very large overall range of speed ratios with one step of very high speed reduction, so as to be particularly adapted for use in the drive of a table of a horizontal boring mill, for example, to allow accurate positioning.

Also in FIG. 15 there is shown the control system for the four-stage transmission with two-way solenoid valves SV1 to SV12 for the pairs of brakes of the units.

*FIG. 16 multistage transmission*

Another four-stage transmission constructed in keeping with the invention is shown diagrammatically in FIG. 16. This transmission includes the three units 20, 70, 120 shown in FIGURES 1 and 2, and further includes the two-speed unit 180 of FIG. 7 interposed between the forward-reverse unit 20 and the four-speed input unit 70 of FIGURE 1. Since the transmission of FIGURES 1–3 provides sixteen different speed ratios with forward and reverse, by adding the two-speed unit 180 as aforesaid, the four-stage transmission thus constructed provides thirty-two different speed ratios plus forward and reverse drive.

Such transmission (FIG. 16) is particularly adapted for use as a spindle drive transmission of a horizontal boring mill, for example, although its suitabality for other machine tool applications will be apparent to a man skilled in the art. Because of the large overall speed range (64:1) afforded by the two-speed unit 180 of FIG. 7, it will be seen that one of the other advantageous features of this four-stage transmission is that it will provide very low output speeds in addition to the usual output speeds for transmissions of this type.

A suitable control system for such four-stage transmission is included in FIG. 16. With all brakes of all four units actuated in pairs, two-way solenoid valves SV1 to SV12 associated with each brake pair will serve in the arrangement shown to control the brakes of the transmission.

*FIG. 17 multistage transmission*

A two-stage transmission constructed in accordance with the invention is shown diagrammatically in FIG. 17. This transmission is formed of the input and output units 70, 120 of FIGS. 1 and 2 respectively and thereby provides sixteen different speed ratios. With the hydraulic control circuit depicted in FIG. 17, the transmission is specially suited to use in spindle drives, with the control circuit providing means for braking or locking one side of the transmission, so as to fix the spindle in a fixed rotary position, while allowing the other side of the transmission to idle or coast to a stop. This control is also useful in inching or jogging the spindle drive such as might be desirable for positioning the spindle or tool to a desired rotary position.

Referring to FIG. 17, the control circuit includes a valve 400 having a spool 402 the position of which is under the control of the solenoid valves SV3 to SV8. The spool 402 is shown in its left-hand position as dictated by solenoids SV5 and SV6. In this position, the transmission may be operated or shifted normally. With the solenoids SV5 and SV6 energized to shift the spool to its right-hand position, the first and second brakes I and II of stage 2 are simultaneously opened to pressure (as indicated in dotted lines) causing the output end of the transmission to be locked up or braked. At the same time, passages 404, 406 to brakes III and IV of stage 1 are opened to sump connections S1 and S2 thereby releasing both such brakes III and IV. Referring to FIG. 3, it will be recalled that to drive through the stage 2 unit 70, one or the other of brakes III or IV must be actuated to provide a reaction member for the gear train. Thus, with neither of brakes III or IV actuated the drive through the transmission will be interrupted and the input end of the transmission may idle or coast to a stop.

We claim as our invention:

1. In a multistage transmission, the combination comprising, a plurality of transmission units serving as separate stages thereof, and means for coupling said units, each transmission unit comprising a plurality of annular sections stacked in abutting relation to each other and to an annular section of an adjacent transmission unit to form a housing; a planetary gear train for each transmission unit including a plurality of reaction members rotatably mounted in said housing and adapted to be selectively braked against rotation to obtain different input to output speed ratios from the planetary gear train, certain of said annular sections forming said housing presenting opposed faces adjacent the inner edges thereof and said reaction members being rotatably mounted in bearing relation between said opposed faces to hold said reaction members against substantial axial movement, means defining annular brake cylinders between said annular sections of said units so as to provide a brake cylinder for each said rotatable reaction member, annular pistons in said cylinders, and means connecting each piston with a rotatable reaction member whereby the latter is braked against movement relative to the housing upon actuation of the piston in the cylinder; and said coupling means including a shaft extending between each pair of adjacent units coupling the planetary gear trains thereof in torque transmitting relation.

2. For use in multistage transmissions, a transmission unit to serve as a stage thereof comprising a plurality of annular sections adapted to be stacked in abutting relation to each other and to another unit to form a housing, a planetary gear train including a plurality of internal ring gear reaction members rotatably mounted in said housing and adapted to be selectively braked against rotation to obtain different input to output speed ratios from said planetary gear train, certain of said annular sections forming said housing presenting opposed faces adjacent the inner edges thereof and said reaction members being rotatably mounted in bearing relation between said opposed faces to hold said reaction members against substantial axial movement, said planetary gear train including coaxial input and output shafts connected in torque transmitting relation by said planetary gear train, annular brake cylinders defined between said annular sections so as to provide a brake cylinder for each reaction member, annular pistons in said cylinders, and means connecting each piston with a reaction member whereby the latter is braked against movement relative to the housing upon actuation of the piston in the cylinder.

3. For use in multistage transmissions, a transmission unit to serve as an input stage thereof to provide a selection of four different speed ratios comprising a plurality of annular sections adapted to be stacked in abutting relation to each other and to an adjacent output unit to form a housing, a planetary gear train in said housing including a reaction sun gear and three reaction ring gears rotatably mounted in said housing and adapted to be selectively braked against rotation to obtain said four different input to output speed ratios from said planetary gear train, said planetary gear train further including four planetary gear sets supported by a common carrier with planet gears of two of said sets intermeshed, said sun gear being intermeshed with gears of one of said two sets and said reaction ring gears being intermeshed with gears of other sets, coaxial input and output shafts connected in torque transmitting relation by said planetary gear train, annular brake cylinders defined between said annular sections so as to provide a brake cylinder for each reaction gear, annular pistons in said cylinders, and means connecting each piston with a reaction gear whereby the latter is braked against movement relative to the housing upon actuation of the piston in the cylinder.

4. For use in multistage transmissions, a transmission unit to serve as an input stage thereof to provide a selection of X different speed ratios comprising a plurality of annular sections adapted to be stacked in abutting relation to each other and to an adjacent input unit to form a housing, a planetary gear train in said housing including a reaction sun gear and (X−1) reaction ring gears rotatably mounted in said housing and adapted to be selectively braked against rotation to obtain said X different input to output speed ratios from said planetary gear train, said planetary gear train further including X planetary gear sets supported by a common carrier with planet gears of two of said sets intermeshed, said sun gear being intermeshed with gears of one of said two sets and said reaction ring gears being intermeshed with gears of other sets.

coaxial input and output shafts, (X-1) driving sun gears on said input shaft intermeshed with gears of said other planetary gear sets, said carrier being connected to said output shaft, annular brake cylinders defined between said annular sections so as to provide a brake cylinder for each reaction gear, annular pistons in said cylinders, and means connecting each piston with a reaction gear whereby the latter is braked against movement relative to the housing upon actuation of the piston in the cylinder.

5. For use in multistage transmissions, a transmission unit to serve as an input stage thereof comprising a plurality of annular sections adapted to be stacked in abutting relation to each other and to another unit to form a housing, a planetary gear train including a reaction ring gear and a reaction sun gear rotatably mounted in said housing and adapted to be selectively braked against rotation to obtain different input to output speed ratios from said planetary gear train, said planetary gear train further including two planetary gear sets supported by a common carrier and both intermeshed with said reaction ring gear, gears of one of said gear sets being also intermeshed with said reaction sun gear, coaxial input and output shafts, said carrier being connected to said input shaft, a driven sun gear connected to said output shaft and intermeshed with gears of the other of said gear sets, annular brake cylinders defined between said annular sections so as to provide a brake cylinder for each reaction gear, annular pistons in said cylinders, and means connecting each piston with a reaction gear whereby the latter is braked against movement relative to the housing upon actuation of the piston in the cylinder.

6. In a multistage transmission, the combination comprising, a first section, a second section, and means for coupling said sections; said first section including a housing, an input shaft journalled in said housing, and a plurality of planetary gear trains, each having planet gears, in driven relation to said input shaft; and second section including a housing, an output shaft journalled in said second section housing, and a plurality of planetary gear trains, each having planet gears in driving relation to said output shaft; said coupling means including means for operably fixing said housings in axial alignment, and a shaft extending between said sections coupling said planetary gear trains in torque transmitting relation, said shaft carrying gears intermeshed with planet gears of both said sections planetary gear trains and being without direct bearing support but being supported for alignment purposes in said planet gears of both said sections.

7. In a multistage transmission, the combination comprising, a first section, a second section, and means for coupling said sections; said first section including a housing, an input shaft journalled in said housing, and a plurality of planetary gear trains, each having planet gears, in driven relation to said input shaft; said second section including a housing, an output shaft journalled in said second section housing coaxially of said input shaft, and a plurality of planetary gear trains, each having planet gears in driving relation to said output shaft; said coupling means including means for operably fixing said housings in axial alignment, and a coupling shaft extending between said sections and being mounted in said housings coaxially of said input and output shafts operable independently thereof to couple said planetary gear trains in torque transmitting relation, said coupling shaft carrying gears intermeshed with planet gears of both said sections planetary gear trains and being without direct bearing support but being supported for alignment and even load distribution in said planet gears of both said sections.

8. In a multistage transmission, the combination comprising, first and second planetary transmission units having coaxial input and output shafts, means coupling said units in torque transmitting relation including a coupling shaft coaxial with said input and output shafts, each said unit including a planetary gear train connected to said coupling shaft, said planetary gear train having a plurality of rotatable internal ring gear reaction members adapted to be selectively braked against rotation to obtain different input to output speed ratios, each said unit further including a plurality of annular sections stacked in abutting relation to each other and to an end annular section of the other unit to form a fixed external housing for the respective planetary gear train, said annular sections forming said housing presenting opposed faces adjacent the inner edges thereof and said reaction members being rotatably mounted in bearing relation between said opposed faces to hold said reaction members against substantial axial movement, means defining annular brake cylinders between sections of each said unit to provide a brake cylinder for each rotatable reaction member, annular pistons in said cylinders, means connecting each piston and the associated reaction member whereby the latter is braked against movement relative to the housing upon actuation of the piston, and common control means for said brake cylinders of said first and second transmission units including selectively operable valve means for controlling the supply of pressure to said brake cylinders to actuate said pistons.

9. In a multistage transmission, the combination comprising, input and output planetary transmission units having coaxial input and output shafts respectively, and a coupling shaft between said units and coaxial with said input and output shafts; each said unit including a planetary gear train connected in torque transmitting relation to said coupling shaft and to one of said input and ouput shafts, and having a plurality of rotatable internal ring gear reaction members, a plurality of annular sections stacked in abutting relation to form a fixed external housing around said planetary gear train, said annular sections forming said housing presenting opposed faces adjacent the inner edges thereof and said reaction members being rotatably mounted in bearing relation between said opposed faces to hold said reaction members against substantial axial movement, brake mechanisms for braking said rotatable reaction members, said sections being formed to define annular brake cylinders for said mechanisms between said sections, said mechanisms including annular pistons in said cylinders, annular brake rings adjacent each piston connected to an associated reaction member and mounted for rotation therewith, annular rings mounted between said brake rings for axial movement being connected to a housing section and held thereby against rotation, abutment means on a housing section opposite each annular piston against which the assembly of rings is urged by said piston upon actuation of the same thereby to brake the associated reaction member, and common control means for said brake mechanisms of said input and output planetary transmission units including selectively operable valve means controlling the supply of pressure fluid to said brake cylinders to actuate said pistons.

10. In a multistage transmission, the combination comprising,
 a first section, a second section, and means for coupling said sections,
 said first section including a housing, an input shaft journalled in said housing, and a planetary gear train having a plurality of sets of planet gears in driven relation to said input shaft, each set of planet gears having a rotatable reaction member,
 said second section including a housing, an output shaft journalled in said second section housing, and a planetary gear train having a plurality of sets of planet gears in driving relation to said output shaft, each set of planet gears having a rotatable reaction member,
 said coupling means including means for operably fixing said housings in axial alignment, and a shaft extending between said sections coupling said planetary gear trains in torque transmitting relation,
  said coupling shaft carrying gears intermeshed with gears of said sets of planet gears of both said sections and being without direct bearing support but being cradled for alignment purposes in said planet gears.

11. In a multistage transmission, the combination comprising, a first section, a second section, and means for coupling said sections, said first section including a housing, an input shaft journalled in said housing, and a planetary gear train having a plurality of sets of planet gears in driven relation to said input shaft, each set of planet gears having a rotatable reaction member, said second section including a housing, an output shaft journalled in said second section housing, and a planetary gear train having a plurality of sets of planet gears in driving relation to said output shaft, each set of planet gears having a rotatable reaction member, each said housing comprising a plurality of annular sections stacked in abutting relation, means defining annular brake cylinders between said annular sections, annular brake pistons in said cylinders, and means connecting said pistons to rotatable reaction members of said planetary gear trains, said coupling means including means for operably fixing said housings in axial alignment, and a shaft extending between said sections coupling said planetary gear trains in torque transmitting relation, said coupling shaft carrying gears intermeshed with gears of said sets of planet gears of both said sections and being without direct bearing support but being cradled for alignment purposes in said planet gears.

References Cited by the Examiner

UNITED STATES PATENTS

| | | | |
|---|---|---|---|
| 782,547 | 2/1905 | Coffee | 74—761 |
| 1,660,997 | 2/1928 | Kearby | 74—769 |
| 1,690,968 | 11/1928 | Cole | 74—769 |
| 2,006,172 | 6/1935 | Klappauf | 74—606 |
| 2,170,444 | 8/1939 | Barbarou | 74—768 |
| 2,215,627 | 9/1940 | Walter | 74—768 |
| 2,249,441 | 7/1941 | Sussman | 74—801 |
| 2,516,203 | 7/1950 | Greenlee et al. | 74—763 |
| 2,624,215 | 1/1953 | McRae. | |
| 2,869,400 | 1/1959 | Langdon | 74—765 |
| 2,873,626 | 2/1959 | Granryd | 74—765 |
| 2,890,603 | 6/1959 | Harris et al. | 74—760 X |
| 2,895,344 | 7/1959 | Holdeman et al. | 74—472 |
| 2,902,888 | 9/1959 | Powischill et al. | 74—760 X |
| 2,956,451 | 10/1960 | Bowman | 74—606 X |
| 3,011,365 | 12/1961 | Stoeckicht | 74—410 X |
| 3,023,640 | 3/1962 | Schou | 74—761 |
| 3,033,333 | 5/1962 | Breting et al. | 74—769 |
| 3,077,795 | 2/1963 | Chambers et al. | 74—768 |
| 3,225,627 | 12/1965 | Christenson | 74—769 |

DAVID J. WILLIAMOWSKY, *Primary Examiner.*

DON A. WAITE, *Examiner.*

T. C. PERRY, *Assistant Examiner.*